Patented Jan. 22, 1946

2,393,357

UNITED STATES PATENT OFFICE 2,393,357

PRODUCTION OF ISOPARAFFINS

Eric William Musther Fawcett and Eric Sylvester Narracott, Sunbury-on-Thames, England, assignors, by mesne assignments, to Anglo-Iranian Oil Company Limited, London, England, a company No Drawing. Application June 23, 1941, Serial No. 399,392. In Great Britain March 1, 1940

4 Claims. (Cl. 260—683.5)

This invention relates to the production of isobutane by the isomerisation of the normal paraffin.

It is known that a substantial yield of isobutane is produced by the catalytic treatment of n-butane at elevated temperatures in the presence of aluminum chloride or aluminium bromide. The use of these catalysts is however attended with certain disadvantages, namely the low melting point of aluminium bromide (about 90° C.) and the high volatility and relatively low activity of aluminium chloride at temperatures below 100° C.

The invention has among its objects to avoid these disadvantages and this object is attained according to the invention by employing as catalysts aluminium chlorobromides and particularly aluminium dichlorobromide.

Aluminium dichlorobromide may be readily prepared by reacting on aluminium bromide with carbonyl chloride or in any other known and convenient manner.

In carrying the invention into effect the reaction may be carried out at elevated temperatures which in no case exceed 200° C. in either liquid or vapour phase. Superatmospheric pressure may be employed either to maintain the desired liquid phase or to increase the output of a given reaction volume in the vapour phase.

The reaction may be carried out in a batch process or in a continuous process, and if desired the catalyst may be used with the addition of a hydrogen halide. The catalyst may be employed either in the form of powder, lumps or pellets, or alternatively in admixture with or absorbed on porous substances such as alumina, silica gel or bauxite.

The reaction does not proceed to completion and the product leaving the catalyst chambers will normally contain 10–80% of isobutane. The product may then be submitted to fractionation usually by distillation and the n-butane or n-butane rich fraction may be returned to the isomerization process, while the isobutane or isobutane rich fraction may be processed in known manner with suitable olefin hydrocarbons to yield hydrocarbons of higher molecular weight, which are valuable components of liquid fuels of high octane number.

The following are examples of particular conditions of carrying out the process:

*Example I.*—A slow stream of n-butane containing 3% of isobutane is passed in admixture with 1% by volume of hydrochloric acid gas through a bed of catalyst consisting of alumina gel dried at 450° C. and mixed with 6% by weight of aluminium dichlorobromide. The temperature of the catalyst is 110° C. and the pressure is atmospheric. The vapour stream leaving the catalyst chamber contains 42% isobutane with traces of hydrocarbons of lower molecular weight.

*Example II.*—A steel pressure vessel is charged with 500 grams of normal butane containing 2% by weight of dry hydrogen chloride and 50 grams of aluminium chlorobromide. The reaction vessel is heated to 80° C. and maintained at that temperature for 10 hours. After removal of HCl and the catalyst, the butane fraction was found to contain 33% of isobutane.

We claim:

1. A process for the isomerisation of normal butane, consisting in subjecting normal butane to contact with a catalyst consisting of an aluminium chlorobromide, at a temperature not exceeding 200° C.

2. A process for the isomerisation of normal butane, consisting in subjecting normal butane to contact with a catalyst consisting of aluminium dichlorobromide, at a temperature not exceeding 200° C.

3. A process for the isomerisation of normal butane as specified in claim 1, carried out in the presence of hydrogen chloride.

4. A process for the isomerization of a normal hydrocarbon, consisting in subjecting the hydrocarbon to contact with a catalyst consisting of an aluminum chlorobromide, at a temperature not exceeding 200° C.

ERIC WILLIAM MUSTHER FAWCETT.
ERIC SYLVESTER NARRACOTT.